(12) United States Patent
Corghi

(10) Patent No.: US 6,823,732 B2
(45) Date of Patent: Nov. 30, 2004

(54) BALANCING MACHINE

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 10/673,472

(22) Filed: Sep. 30, 2003

(65) Prior Publication Data

US 2004/0065149 A1 Apr. 8, 2004

(30) Foreign Application Priority Data

Oct. 2, 2002 (IT) .................... RE2002A0073

(51) Int. Cl.⁷ ............... G01M 1/02; G01M 1/04
(52) U.S. Cl. ............... 73/471; 73/460; 73/462
(58) Field of Search ............ 73/66, 460, 462, 73/471, 473, 475, 487

(56) References Cited

U.S. PATENT DOCUMENTS

| | | | | |
|---|---|---|---|---|
| 3,922,922 A | * | 12/1975 | Goebel | 73/462 |
| 3,924,473 A | | 12/1975 | Maus | |
| 4,031,760 A | * | 6/1977 | Muller | 73/460 |
| 4,593,564 A | | 6/1986 | Brihier | |
| 5,060,513 A | * | 10/1991 | Rothamel | 73/462 |
| 5,201,224 A | * | 4/1993 | Rogers et al. | 73/462 |
| 5,576,490 A | * | 11/1996 | Gross et al. | 73/462 |
| 5,717,138 A | * | 2/1998 | Goebel | 73/462 |

* cited by examiner

Primary Examiner—Hezron Williams
Assistant Examiner—John Hanley
(74) Attorney, Agent, or Firm—Browdy and Neimark, P.L.L.C.

(57) ABSTRACT

Balancing machine comprising a shell or frame (3) suspension-mounted on a bed (2) via elastic supports, a shaft (8) rotatably supported by said frame at two points spaced a predetermined distance apart and having that end emerging from the bed provided with means (80) for locking a wheel (11), drive means for rotating said shaft, and force transducer means (33) applied between the bed and the shaft, characterised in that the drive means are rigid with the suspension-mounted frame, between the bed (2) and frame (3) there being interposed an elastic support comprising at least two coplanar leaf springs (4, 5) symmetrical about the shaft axis and positioned in a plane perpendicular to the plane containing the axes of said drive means, of said shaft and of said transducer means.

6 Claims, 2 Drawing Sheets

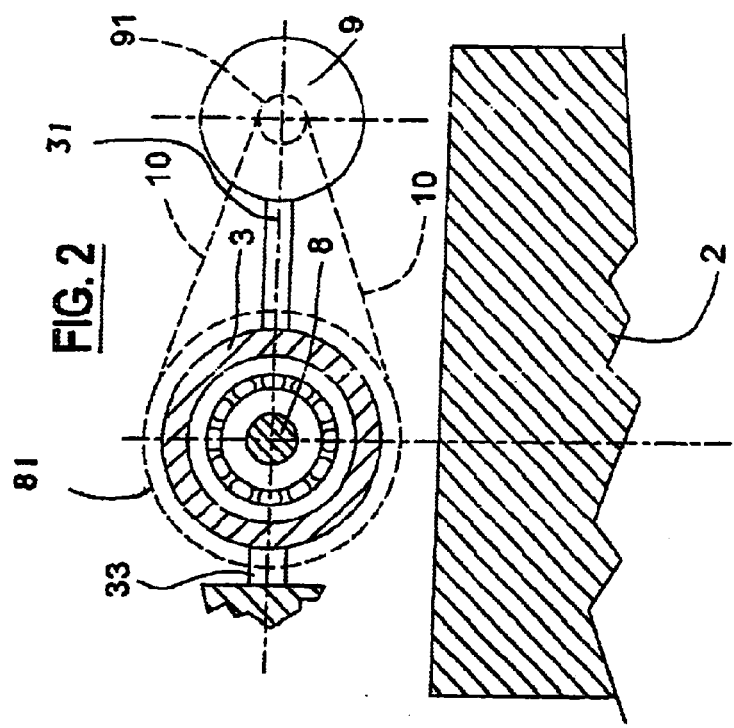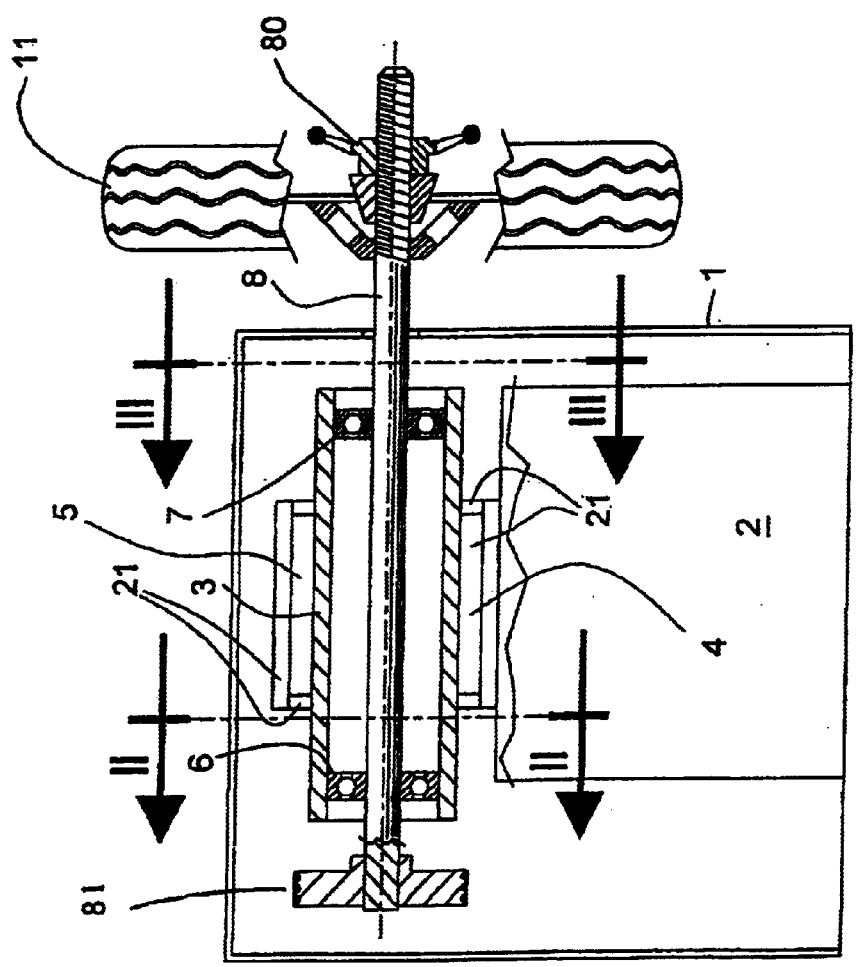

BALANCING MACHINE

BACKGROUND OF THE INVENTION

1. Technical Field of the Invention

This patent relates to balancing machines in general, and in particular to balancing machines for motor vehicle wheels.

2. Prior Art

These machines comprise a rotary shaft supported at two points by a generally tubular frame fixed to a very rigid bed.

The shaft is connected to means for rotating it at a determined speed, on that of its ends which projects from the frame it supporting the wheel to be balanced.

The frame is supported on the bed via elastic means which give the frame a freedom of movement in a predetermined direction, and is associated with two force transducers which read the forces induced by the wheel imbalance when this is rotated.

So-called fixed shaft machines are also known in which the shaft is directly supported by the bed, and carries at its projecting end a rotary assembly for supporting the wheel.

Hereinafter a rotary shaft machine will be described, however that stated applies equally well to a fixed shaft machine by merely replacing the fixed shaft by the aforesaid frame.

Said two force transducers are positioned at a determined distance apart, to define the two planes perpendicular to the shaft axis in which the imbalance forces are measured.

A processor processes the values of said imbalance forces and calculates the value and the position of the balancing masses in two different planes of the wheel.

The general characteristics of balancing machines are well known to the expert of the art, hence a more detailed description thereof will be omitted. It will merely be noted here that to make the effect of the inertial forces generated by the rotating system negligible compared with the imbalance forces, the resonance frequency of the entire machine, including its rotating parts, must be much greater than the rotational speed of the shaft. The present patent relates in particular to the elastic suspensions on the frame which carries the rotary shaft.

The arrangement generally used for said suspensions comprises a pair of coplanar leaf springs positioned spaced apart and arranged to deform within the plane perpendicular to the shaft axis.

Said leaf springs lie in a plane parallel to the shaft axis, which may also sometimes contain said axis.

One of the problems which afflict known machines rises from the need to rotate the wheel to be balanced at a constant speed, without the motion transmission means influencing the balance measurement which is to be effected.

In order to nullify the influencing effect of the means which rotate the rotary assembly of the machine, solutions have been devised in which this assembly is initially rotated at a predetermined speed, but with total disengagement of the rotation means while effecting the measurement. However these solutions present subordinate drawbacks which sometimes make their use inconvenient.

A first important drawback arises from the fact that while effecting measurements the speed inevitably decreases, so negatively influencing the measurements.

A second drawback arises from the presence of disengagable couplings, the operation and construction of which are complicated and which are of high cost.

OBJECT AND SUMMARY OF THE INVENTION

The object of this patent is to provide a balancing machine of simple and economical construction which is free of the aforesaid drawbacks.

Specifically the invention concerns a machine in which the means which rotate the moving assembly are always engaged.

The objects of the invention are attained by a balancing machine described as follows.

In detail, the balancing machine of the invention comprises a permanently engaged belt transmission and, for the moving assembly, elastic suspension means consisting of two coplanar leaf springs positioned diametrically in relation to the shell which comprises the moving assembly and lying in a plane perpendicular to the plane which connects the axis of the moving assembly to the axis of the pulley which rotates it.

The motor, on the shaft of which the drive pulley for the belt transmission is keyed, is rigid with the fixed outer shell or frame of the moving assembly.

By virtue of said configuration, under the pulling action of the belt the two leaf springs deform overall, with a deformation which passes through the axis of the moving assembly, hence their deformation does not stress the force transducers which are disposed in the plane containing the axis of the moving assembly and the axis of the drive pulley.

The different tensions, in whatever manner they vary, to which the two branches of the belt are subjected have a resultant which can be resolved into a first component passing through the axis of the drive pulley and perpendicular to the plane containing the axis of the two pulleys, i.e. the drive and driven pulley, and a second component contained in the plane containing the axes of the drive and driven pulleys.

The second component is absorbed by the rigid connection between the motor and the shell of the moving assembly, and hence does not act on the force transducers.

The first component, translated into the plane containing the axis of the moving assembly, stresses the leaf springs one in compression and one in tension in the plane in which they lie, and generates a moment which deforms the leaf springs symmetrically, with a deformation having a neutral axis passing through the axis of the moving assembly. Hence the first component does not stress the force transducers.

Any shape irregularity of the belt results in asymmetry of the tensions in the two branches which in its turn results in a force and a moment similar to the aforedefined, and hence does not influence the force transducers. In this respect, the force transducers are applied to the shell supporting the rotary assembly in the diametrical plane containing its axis and the axis of the drive pulley, and pick up only those forces due to the imbalance, the other forces all being mutually balanced or non-influential to the transducers.

The aforestated also applies if the motion transmission is by a friction roller or gearwheels.

BRIEF DESCRIPTION OF THE DRAWINGS

The constructional and operational merits and characteristics of the invention will be more apparent from the ensuing detailed description, which with the aid of the accompanying drawings describes a particular preferred embodiment thereof by way of non-limiting example.

FIG. 1 is a partly sectional schematic side view of a balancing machine.

FIG. 2 is the section II—II of FIG. 1.

DETAILED DESCRIPTION OF THE PREFERRED EMBODIMENT(S) OF THE INVENTION

Figure 6:
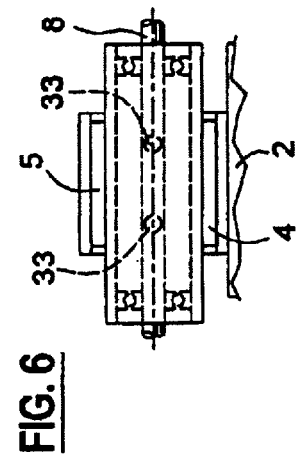
FIG. 6 shows a different position of the force transducers.

The figures show a robust bed 1 comprising a central block 2 which supports the tubular balancing frame 3 via elastic supports 4 and 5 connected to the C-shaped structure 21.

A motor 9 is rigidly supported by the tubular balancing frame 3 which is connected to the motor 9 by a bracket 31.

The balancing frame 3 comprises two coaxial rolling bearings 6 and 7 which support the rotating shaft 8 of the machine.

Via the pulley 91 and the belt transmission 10, an electric motor 9 rotates the pulley 81 of the shaft 8 at a predetermined constant speed.

One end of the shaft 8 comprises self-centering means 80 for locking the wheel 11 to be balanced onto the shaft and force transducers 33.

The elastic supports 4 and 5 consist of two symmetrically disposed coplanar leaf springs lying in the plane perpendicular to the plane containing the axes of the pulleys 81 and 91.

In the case of roller or gearwheel drive, the leaf springs lie in the plane perpendicular to the plane containing the axis of the drive roller or gearwheel and of the moving assembly.

The arrangement and the form of said supports is such that, under the action of the forces transmitted by the drive means, they assume a symmetrical deformed configuration passing through the axis of the shaft 8 which does not influence the further deformations induced by the imbalance forces.

The imbalance forces proportional to the deformations of the supports 4 and 5 are measured by a pair of force transducers 33 which, by virtue of the structure and position of the supports 4 and 5, can be spaced apart at minimum distance feasible, so as to measure very high forces.

Essentially, said force transducers measure forces proportional to the deformation of the elastic means within the plane containing the axis of the moving assembly and the axis of the drive pulley, they being more sensitive the closer they are together and the greater the deformation of the elastic means.

Under the action of the rotating imbalance forces the bearings which connect the shaft to the frame tend to undergo oscillations within the plane perpendicular to the plane of the supports 4 and 5, these oscillations resulting in a movement of the frame which causes the elastic suspensions to deform not only by flexure but also by torsion.

Figure 7:
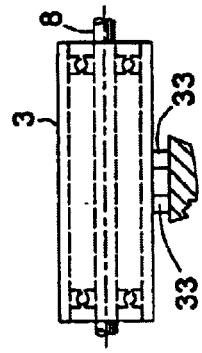
FIG. 7 is a view of FIG. 6 from above.
Figure 5:
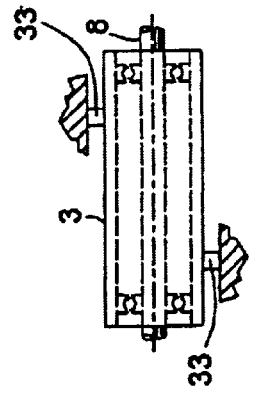
FIG. 5 is a view of FIG. 4 from above.
Figure 3:
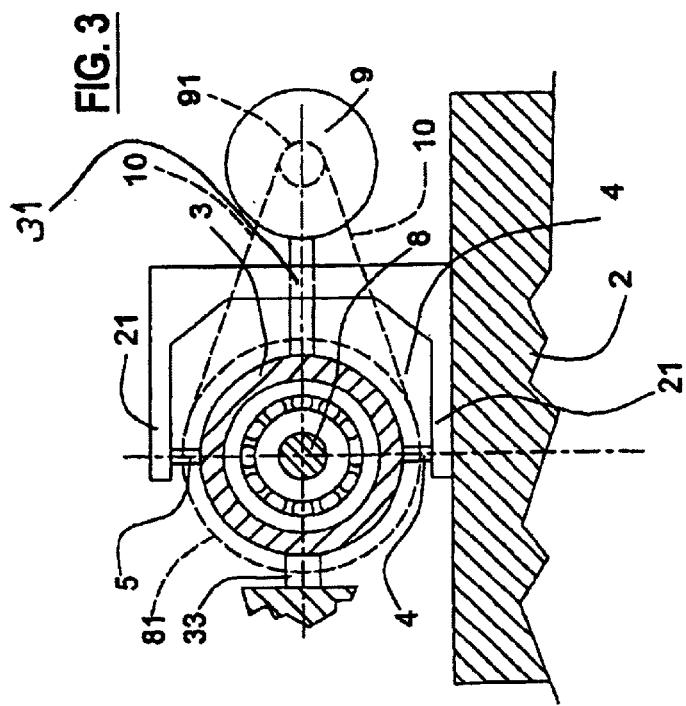
FIG. 3 is the section III—III of FIG. 1.
Figure 4:
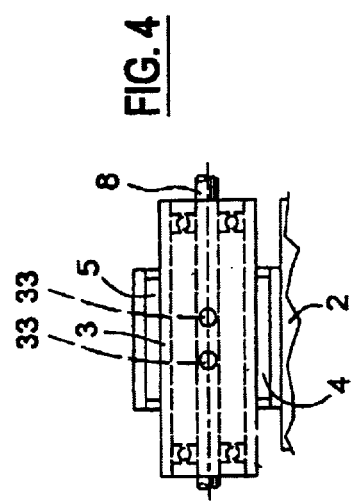
FIG. 4 shows the position of the force transducers.

The position of the transducers 33 can be chosen in many different ways, for example they can be associated with the shaft as in FIG. 4 and FIG. 5, or again as in FIG. 6 and in FIG. 7.

What is claimed is:

1. A balancing machine comprising a frame suspension-mounted on a bed via elastic supports, a shaft rotatably supported by said frame at two points spaced a predetermined distance apart and having a first end provided with means for locking a wheel, and a second end connected to drive means for rotating said shaft, and at least two force transducers fixed between the bed and the frame, wherein the drive means comprise an electric motor fixed to and supported by the suspension-mounted frame, between the bed and frame there being interposed an elastic support comprising at least two coplanar leaf springs symmetrical about the axis of the shaft and positioned in a plane perpendicular to the plane containing the axis of said drive means, the axis of said shaft and said transducer means.

2. A machine as claimed in claim 1, wherein said drive means include a belt transmission.

3. A machine is claimed in claim 1, wherein the force transducers are applied on the same side of the shaft.

4. A machine as claimed in claim 1, wherein the force transducers are applied on opposite sides of the shaft.

5. A machine as claimed in claim 1, wherein the force transducers are spaced apart at a minimum distance feasible.

6. A machine as claimed in claim 1, wherein the force transducer means are applied directly between the frame and the bed.

* * * * *